(12) United States Patent
Lee

(10) Patent No.: US 12,094,344 B2
(45) Date of Patent: Sep. 17, 2024

(54) SYSTEM FOR PROVIDING BIG DATA-BASED ARTIFICIAL INTELLIGENCE AUTOMATIC ALLOCATION MATCHING SERVICE USING TAXI DEMAND PREDICTION

(71) Applicant: Nature Mobility Co., Ltd., Jeju-si (KR)

(72) Inventor: Ju Sang Lee, Seoul (KR)

(73) Assignee: Nature Mobility Co., Ltd., Jeju-si (KR)

( * ) Notice: Subject to any disclaimer, the term of this patent is extended or adjusted under 35 U.S.C. 154(b) by 792 days.

(21) Appl. No.: 17/036,466

(22) Filed: Sep. 29, 2020

(65) Prior Publication Data

US 2021/0366287 A1 Nov. 25, 2021

(30) Foreign Application Priority Data

May 20, 2020 (KR) ........................ 10-2020-0060543

(51) Int. Cl.
| | |
|---|---|
| *G06N 20/00* | (2019.01) |
| *G06Q 10/04* | (2023.01) |
| *G06Q 10/0631* | (2023.01) |
| *G06Q 50/40* | (2024.01) |
| *G08G 1/00* | (2006.01) |
| *H04W 4/02* | (2018.01) |

(52) U.S. Cl.
CPC ............. *G08G 1/202* (2013.01); *G06N 20/00* (2019.01); *G06Q 10/04* (2013.01); *G06Q 10/06315* (2013.01); *G06Q 50/40* (2024.01); *H04W 4/023* (2013.01)

(58) Field of Classification Search
CPC ........ G08G 1/202; G06N 30/00; G06Q 10/04; G06Q 50/30; H04W 4/023
See application file for complete search history.

(56) References Cited

U.S. PATENT DOCUMENTS

| | | | | |
|---|---|---|---|---|
| 2018/0341276 | A1* | 11/2018 | Kislovskiy | ....... G08G 1/096838 |
| 2018/0341895 | A1* | 11/2018 | Kislovskiy | ....... G06Q 10/06313 |
| 2019/0146508 | A1* | 5/2019 | Dean | .................... G05D 1/0274 |
| | | | | 701/26 |

(Continued)

FOREIGN PATENT DOCUMENTS

| | | |
|---|---|---|
| JP | H09-34863 A | 2/1997 |
| KR | 10-2003-0054434 A | 7/2003 |
| KR | 10-1655873 B1 | 9/2016 |

(Continued)

OTHER PUBLICATIONS

Yonggian Yang, Multiagent Reinforcement learning based taxi predispatching model to balance taxi supply and demand, Feb. 19, 2020 , https://doi.org/10.1155/2020/8674512 (Year: 2020).*

(Continued)

*Primary Examiner* — Peter D Nolan
*Assistant Examiner* — Mikko Okechukwu Obioha
(74) *Attorney, Agent, or Firm* — Studebaker & Brackett PC

(57) ABSTRACT

Disclosed is a system for providing a big data-based AI automatic allocation matching service using taxi demand prediction. The system comprises a user terminal, a taxi terminal and a matching service providing server including a big datafication unit, a prediction unit, a transmission unit, a matching unit, and an alarm unit.

5 Claims, 9 Drawing Sheets

(56) References Cited

U.S. PATENT DOCUMENTS

2022/0351135 A1* 11/2022 Boye .................... G06Q 10/067

FOREIGN PATENT DOCUMENTS

| KR | 10-1812775 B1 | 1/2018 |
| KR | 10-2018-0051452 A | 5/2018 |
| KR | 10-2018-0138194 A | 12/2018 |
| KR | 10-2020-0011109 A | 2/2020 |

OTHER PUBLICATIONS

An Office Action mailed by the Korean Intellectual Property Office on Aug. 6, 2020, which corresponds to Korean Patent Application No. 10-2020-0060543 and is related to U.S. Appl. No. 17/036,466; with English language translation.

Youbin Yoon et al., "Taxi passenger demand prediction and movement pattern analysis information provision system using big data", Korean Institute of Industrial Engineers, pp. 2822-2836, Nov. 2018, South Korea; with English language Abstract.

* cited by examiner

7 AM TO 9 AM ON      5 PM TO 7 PM ON
WEEKDAYS           WEEKDAYS
PREDICTED DEMAND X   PREDICTED DEMAND Y bY — SUPPLY STOP
                        kY — SUPPLY START

REAL-TIME SUPPLY A
PREDICTED DEMAND Y

SYSTEM FOR PROVIDING BIG DATA-BASED ARTIFICIAL INTELLIGENCE AUTOMATIC ALLOCATION MATCHING SERVICE USING TAXI DEMAND PREDICTION

CROSS-REFERENCE TO RELATED APPLICATIONS

This application claims the priority of Korean Patent Application No. 10-2020-0060543 filed on May 20, 2020, in the Korean Intellectual Property Office, the disclosure of which is incorporated herein by reference.

BACKGROUND

Technical Field

The present disclosure relates to a system for providing a big data-based artificial intelligence (AI) automatic allocation matching service using taxi demand prediction, and provides a platform which predicts taxi demand with big data and solves an optimal solution of an assignment problem in a short time by a method of obtaining an approximate solution with a simulated annealing, to thereby increase a speed of matching allocation.

Description of the Related Art

Due to recent improvements in the value of big data use, new information or insights through data analysis are giving profits to various fields, and by sharing and providing big data around the world, various services are created, resulting in economic effects. According to analysis of taxi data among big data analysis, taxies are driven in a state in which nearly half of the mileage per day is operated by empty cars, and during times when demand for taxis is concentrated, the number of available taxis sharply decreases, resulting in a severe supply-demand imbalance. Due to the aging of taxi drivers, the supply of taxis significantly decreases during late night when subways and buses are cut off, causing difficulties in getting on the taxis at the dawn of the weekend and at the end of the year when various gatherings are concentrated. Accordingly, crimes targeting drunk persons or drunk driving occurs. Thus, the government introduced a service that predicts taxi demand based on demographic statistics, taxi operation data, and store facility information, but the problems of poor daily use performance and traffic congestion still remain.

In this case, a method of predicting demand for taxis and dispatching call taxis based on predicted demand has been studied and developed. In this regard, Korean Patent Publication No. 2018-0051452 (published on May 16, 2018) and Korean Patent Publication No. 2018-0138194 (published on Dec. 28, 2018) disclose a configuration of collecting future passenger demand information input from a user terminal, and transmitting future taxi allocation demand information to a taxi terminal when it is determined that the number of future passengers for a specific location exceeds a preset number based on the collected future passenger demand information, wherein the future passenger demand information includes a future ride time and a future ride location, and a configuration of receiving driving request information including at least one of a departure and a destination from a passenger terminal, and based on incentive policy including at least one among a region, a time, an incentive amount and an incentive grant criteria, driving request information, and driving request time, selecting a call from the passenger terminal as an incentive call, transmitting a dispatch request for the incentive call to at least one taxi terminal, and providing the incentive amount to a user account of the taxi terminal that accepted the dispatch request, wherein a region and time of the incentive policy are set based on demand and supply information for the call taxi service, the demand and supply information for the call taxi service includes the number of calls and the number of taxi terminals monitored in real time, and when selecting an incentive call based on the number of calls accepted in the region and time of the incentive policy for each user account of the taxi terminal, weight is assigned to the user account of a specific taxi terminal.

However, the above-described configuration uses a competitive allocation method in which a call is exposed to taxi drivers and the taxi drivers compete and receive the call, and under the assumption that the taxi drivers do not reject passengers, the competitive allocation method requires a more amount of supply when supposing that demand is equal. In addition, since an average customer waiting time increases and a minimum number of vehicles required increases, an imbalance in supply and demand also occurs, so the probability of taxi drivers driving with empty vehicles increases, and at the same time, customers also have longer waiting times. Accordingly, there is a need for research and development of a platform that can maximize the efficiency of vehicle allocation, improve a profit structure of taxi business, and establish the foundation for effective application of artificial intelligence technology in mobility businesses such as taxis.

SUMMARY

An exemplary embodiment of the present disclosure may provide a method for providing a big data-based AI automatic allocation matching service using taxi demand prediction, which is capable of reducing a customer waiting time and the number of vehicles moving in an empty state by providing an artificial intelligence algorithm that solves an optimal solution for an assignment problem corresponding to taxi allocation so as to minimize the customer waiting time with a taxi prediction demand and an empty car list as input values, which is capable of making a decision to move taxis to a departure where taxi demand is predicted using an empty car relocation algorithm through taxi demand prediction, and which is capable of minimizing a time required to find an optimal solution by applying a technique of calculating an approximate solution of speed optimization, with the use of a simulated annealing. However, objects to be achieved by various embodiments of the present disclosure are not limited to the technical objects as described above and other technical objects may be present.

In order to achieve the above-described technical object, an exemplary embodiment of the present disclosure includes a user terminal inputting a current location and a destination to call a taxi, and receiving and outputting a vehicle number and an expected arrival time of the called taxi; a taxi terminal receiving a taxi call signal which is matched with automatic allocation in response to a taxi call from the user terminal, and when outputting an approval event in response to the received taxi call signal, starting destination guidance to the current location of the user terminal; and a matching service providing server including a big datafication unit which maps at least one taxi call signal on a location, time, and day of week, stores it as an accumulated history log, and builds big data, a prediction unit which performs data mining on the big data to execute taxi demand prediction based on the taxi call signal corresponding to the location, time, and day of week, a transmission unit which transmits a taxi demand amount that is predicted on the location, time and day of week where the taxi demand prediction is executed, to the taxi terminal, a matching unit which automatically matches a taxi terminal located at a shortest distance from a current location of the user terminal, when receiving the taxi call from the user terminal, and an alarm unit which transmits the taxi call signal to the taxi terminal matched by the matching unit and transmits the vehicle number and the expected arrival time to the user terminal when receiving an approval event.

According to any one of the aspects of the present disclosure, by providing an artificial intelligence algorithm that solves an optimal solution for an assignment problem corresponding to allocation of taxis so as to minimize a customer waiting time with a taxi prediction demand and an empty car list as input values, it is feasible to reduce the customer waiting time and the number of vehicles moving in an empty state, it is feasible to make a decision to move taxis to a departure where taxi demand is predicted using an empty car relocation algorithm through taxi demand prediction, and it is feasible to minimize a time required to find an optimal solution by applying a technique of calculating an approximate solution of speed optimization, with the use of a simulated annealing.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF EMBODIMENTS

Figure 1:
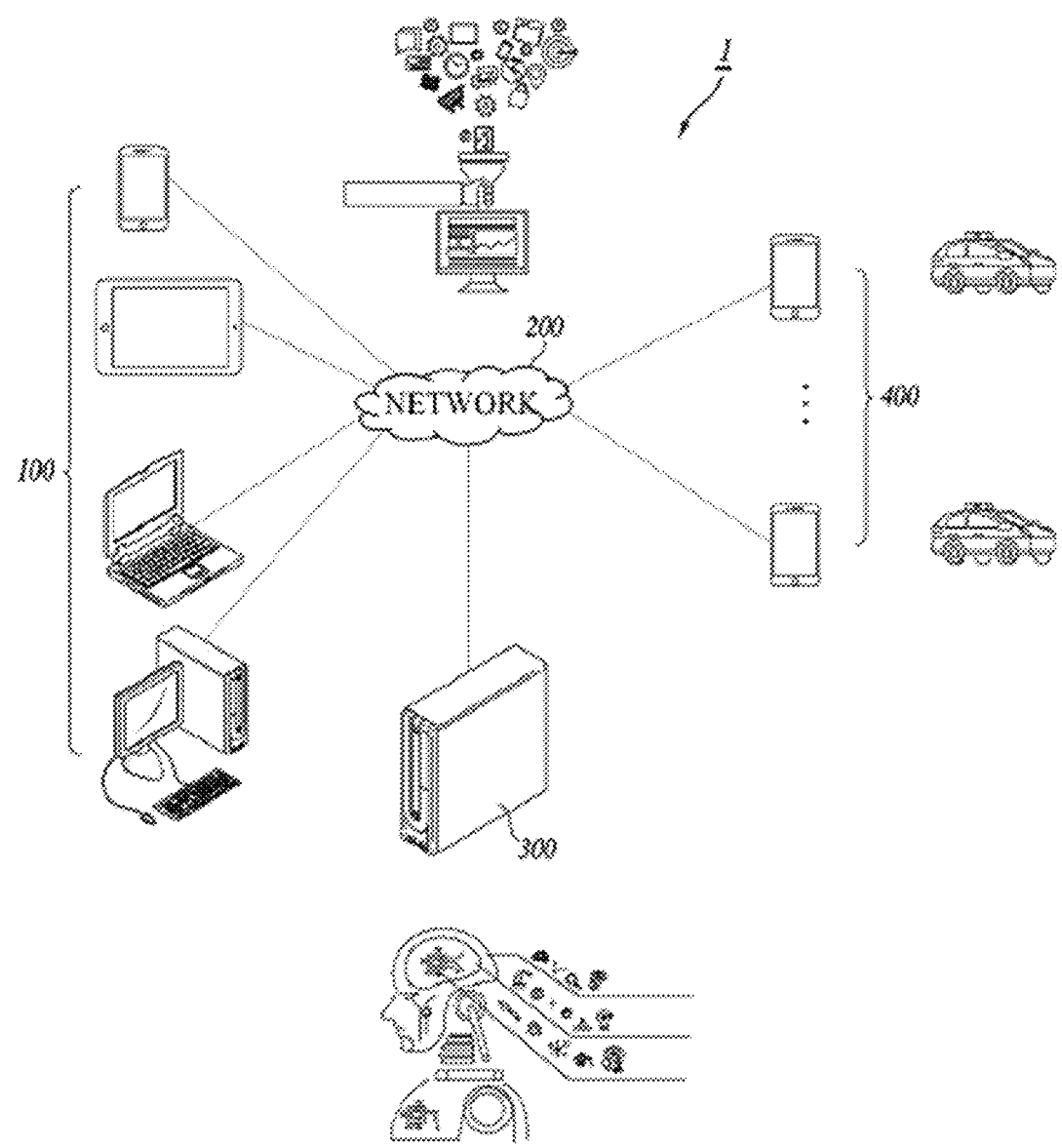
FIG. 1 is a view for explaining a system for providing a big data-based AI automatic allocation matching service using taxi demand prediction according to an exemplary embodiment of the present disclosure.

Hereinafter, exemplary embodiments of the present disclosure will be described more fully hereinafter with reference to the accompanying drawings, so as to be easily carried out by those skilled in the art in the technical field to which the present disclosure belongs to. However, the present disclosure can be realized in various different forms, and is not limited to the exemplary embodiments described herein. Accordingly, in the drawings, in order to clearly describe the present disclosure, parts not related to the description are omitted. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, when a part includes an arbitrary element, it will be understood to imply the inclusion of stated elements but not the exclusion of any other elements. Further, it may be also understood that the presence or addition of one or more other features, numbers, steps, operations, elements, parts, or combinations thereof are not precluded in advance.

The terms "about or approximately" or "substantially" indicating a degree used throughout the specification are used as a numerical value or a meaning close to the numerical value when a unique manufacturing and material tolerance is proposed to the mentioned meaning and also used to prevent unscrupulous infringers from wrongfully using the disclosure in which precise or absolute numerical values are mentioned for better understanding of the present disclosure. Terms used throughout the specification, "~ ing step" or "step of~" do not mean "step for~".

Further, in the specification, the term "unit" includes a unit implemented by hardware, a unit implemented by software, and a unit implemented by both the hardware and the software. Further, one unit may be implemented using two or more hardwares or two or more units may be implemented by one hardware. However, the term "~unit" is not limited to the software or the hardware but may be configured to be provided in an addressable storage medium or configured to reproduce one or more processors. Accordingly, as an example, "~unit" includes components such as software components, object-oriented software components, class components, and task components, processes, functions, attributes, procedures, subroutines, segments of a program code, drivers, a firmware, a microcode, a circuit, data, database, data structures, tables, arrays, and variables. A function which is provided in the components and "~units" may be combined with a smaller number of components and "~units" or divided into additional components and "~units". Further, the components and "~units" may be implemented to reproduce one or more CPUs in a device or a security multimedia card.

In the present specification, some of operations or functions which are described as being performed by a terminal or a device may also be performed by a server connected to the corresponding terminal or device instead. Likewise, some of the operations or functions described as being performed by the server may also be performed on a terminal or device connected to the server.

In the specification, a part of operations or functions of mapping or matching with a terminal may be interpreted as a meaning of mapping or matching a unique number of a terminal which is identification information of the terminal or personal identification information.

In the present specification, allocating or allocation of taxies is not selected by a taxi driver and means performing compulsory matching and transmitting a result thereof. The taxi driver may refuse the allocation or allocating, but the allocation or allocating is not affected by whether or not the taxi driver accepts it.

In this specification, a taxi demand prediction result is not sent to a taxi driver as a reference, and is defined as sending a movement command to the taxi driver after making a decision to relocate it using the predicted result.

Hereinafter, the present disclosure will be described in detail with reference to the accompanying drawings.

FIG. 1 is a view for explaining a system for providing a big data-based AI automatic allocation matching service using taxi demand prediction according to an exemplary embodiment of the present disclosure. Referring to FIG. 1, a system 1 for providing a big data-based AI automatic allocation matching service using taxi demand prediction may include at least one user terminal 100, a matching service providing server 300, and at least one taxi terminal 400. However, since this system 1 for providing a big data-based AI automatic allocation matching service using taxi demand prediction, which is illustrated in FIG. 1, is only an exemplary embodiment of the present disclosure, the present disclosure is not restrictedly interpreted through FIG. 1.

In this case, respective components of FIG. 1 are generally connected through a network 200. For example, as illustrated in FIG. 1, at least one user terminal 100 may be connected to the matching service providing server 300 through the network 200. And, the matching service providing server 300 may be connected to at least one user terminal 100 and at least one taxi terminal 400 through the network 200. Further, at least one taxi terminal 400 may be connected to the matching service providing server 300 through the network 200.

Here, the network refers to a connection structure in which information can be exchanged between respective nodes such as a plurality of terminals and servers, and examples of the network include a local area network (LAN), a wide area network (WAN), Internet (WWW: world wide web), a wired/wireless data communication network, a telephone network, a wired/wireless television communication network, and the like. Examples of the wireless data communication network include 3G, 4G, 5G, 3rd generation partnership project (3GPP), 5th generation partnership project (5GPP), long term evolution (LTE), world interoperability for microwave access (WIMAX), Wi-Fi, Internet, local area network (LAN), wireless local area network (Wireless LAN), wide area network (WAN), personal area network (PAN), radio frequency (RF), Bluetooth network, near-field communication (NFC) network, satellite broadcasting network, analog broadcasting network, digital multimedia broadcasting network (DMB), and the like, but are not limited thereto.

In the following description, it is obvious that the term "at least one" is defined as a term including a singular form and a plural form and even though the term "at least one" is not used, it is obvious that each component may be provided as a singular form or a plural form and it means a singular form or a plural form. Further, each component may be provided as a singular form or a plural form depending on the exemplary embodiments.

At least one user terminal 100 may be a passenger's terminal receiving a taxi call and matching through AI automatic allocation using a web page, an App page, a program, or an application related to a big data-based AI automatic allocation matching service using taxi demand prediction. In this case, at least one user terminal 100 may be a terminal which inputs a current location and a destination, transmits a taxi call to the matching service providing server 300, and receives and outputs a vehicle number and an expected arrival time of a taxi that is matched in a one-to-one manner from the matching service providing server 300.

Here, at least one user terminal 100 may be implemented by a computer which is accessible to a server or a terminal at a distance place through a network. Here, the computer may include, for example, a notebook computer, a desktop computer, a laptop computer, or the like in which a navigation and a web browser are loaded. In this case, at least one user terminal 100 may be implemented by a terminal which is accessible to a server or a terminal at a distance place through a network. At least one user terminal 100 may include all kinds of handheld wireless communication device which ensures portability and mobility, such as a navigation, a personal communication system (PCS), a global system for mobile communication (GSM), a personal digital cellular (PDC), a personal handyphone system (PHS), a personal digital assistant (PDA), an international mobile telecommunication (IMT)-2000, code division multiple access (CDMA)-2000, W-code division multiple access (W-CDMA), a wireless broadband internet (Wibro) terminal, a smart phone, a smart pad, and a tablet PC.

The matching service providing server 300 may be a server which provides a big data-based AI automatic allocation matching service web page, app page, program, or application using taxi demand prediction. In addition, the matching service providing server 300 may be a server which accumulates and stores at least one taxi call number with parameters such as places (a call location and a destination), a time, a day of the week and the like and builds big data. In addition, the matching service providing server 300 may be a server which analyzes big data to calculate predicted taxi demand for the place, time and day of the week, and provides information so as to move an empty vehicle to a corresponding place on a corresponding day of the week and time according to the calculated prediction demand. In addition, the matching service providing server 300 may be a server which performs matching in a method of selecting the taxi terminal 400 located at a shortest distance from the user terminal 100, transmitting the call to the taxi terminal 400, and then, confirming whether or not it is accepted, rather not competitive matching, when it receives a taxi call from the user terminal 100. Of course, competitive matching according to the prior art is not excluded. In addition, the matching service providing server 300 may be a server which figures out a location of the taxi terminal 400 in real time and does not provide or stop a movement alarm when the amount of real-time supply is greater than the predicted demand, and provides a movement alarm when vice versa. In addition, the matching service providing server 300 may be a server which goes through a process of solving a problem of calculating an optimal solution for an assignment problem when performing AI automatic matching, and performs automatic matching by a method of calculating an approximate solution using a simulated annealing for fast calculation.

Here, the matching service providing server 300 may be implemented by a computer which is accessible to a server or a terminal at a distance place through a network. Here, the computer may include, for example, a notebook computer, a desktop computer, a laptop computer, or the like in which a navigation and a web browser are loaded.

At least one taxi terminal 400 may be a terminal of a taxi driver, using a web page, an App page, a program, or an application related to a big data-based AI automatic allocation matching service using taxi demand prediction. In this case, at least one taxi terminal 400 may be a terminal which generates an event of acceptance or rejection when receiving AI automatic matching from the matching service providing server 300. When receiving matching, a taxi driver only needs to choose one of acceptance or rejection. And, the taxi terminal 400 may be a terminal which interworks with a meter installed in a taxi and when the meter starts counting, performs transmission to the matching service providing server 300 to exclude the corresponding taxi from an empty car list. The taxi terminal 400 may be a terminal which allows a GPS signal to be transmitted to the matching service providing server 300 in real time. In addition, the taxi terminal 400 may be a terminal which collects taxi demand prediction information from the matching service providing server 300 and receives a movement alarm or a movement-stop alarm.

Here, at least one taxi terminal 400 may be implemented by a computer which is accessible to a server or a terminal at a distance place through a network. Here, the computer may include, for example, a notebook computer, a desktop computer, a laptop computer, or the like in which a navigation and a web browser are loaded. In this case, at least one taxi terminal 400 may be implemented by a terminal which is accessible to a server or a terminal at a distance place through a network. At least one taxi terminal 400 may include all kinds of handheld wireless communication device which ensures a portability and a mobility, such as a navigation, a personal communication system (PCS), a global system for mobile communication (GSM), a personal digital cellular (PDC), a personal handyphone system (PHS), a personal digital assistant (PDA), an international mobile telecommunication (IMT)-2000, code division multiple access (CDMA)-2000, W-code division multiple access (W-CDMA), a wireless broadband internet (Wibro) terminal, a smart phone, a smart pad, and a tablet PC.

Figure 2:
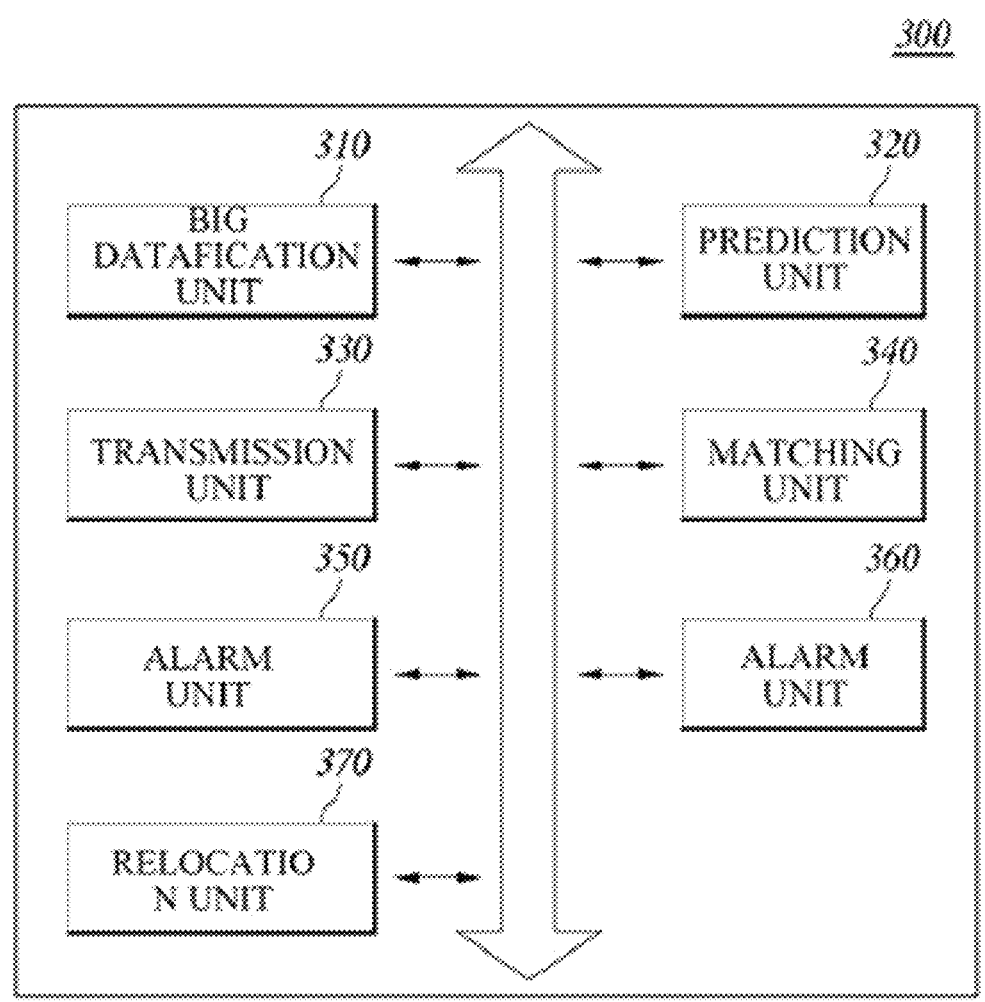
FIG. 2 is a block configuration diagram for explaining a matching service providing server included in the system of FIG. 1.

FIG. 2 is a block configuration diagram for explaining a matching service providing server included in the system of FIG. 1. FIGS. 3A to 5B are views for explaining an exemplary embodiment in which a big data-based AI automatic allocation matching service using taxi demand prediction according to an exemplary embodiment of the present disclosure is implemented.

Referring to FIG. 2, the matching service providing server 300 may include a big datafication unit 310, a prediction unit 320, a transmission unit 330, a matching unit 340, an alarm unit 350, an update unit 360, and a relocation unit 370.

When the matching service providing server 300 according to an exemplary embodiment of the present disclosure or another server (not illustrated) which interworks therewith transmits a big data-based AI automatic allocation matching service application, program, App page, web page, or the like using taxi demand prediction, to at least one user terminal 100 and at least one taxi terminal 400, the at least one user terminal 100 and the at least one taxi terminal 400 may install or open the big data-based AI automatic allocation matching service application, program, App page, web page, or the like using taxi demand prediction. Further, a service program may be driven in at least one user terminal 100 and at least one taxi terminal 400 using a script which is executed in the web browser. Here, the web browser is a program which enables a user to use the Web (WWW: world wide web) service and also refers to a program which receives and shows a hypertext described by the hypertext mark-up language (HTML) and for example, includes Netscape, Explorer, Chrome, and the like. Further, the application refers to an application program on the terminal and for example, includes App executed in the mobile terminal (smart phone).

Referring to FIG. 2, the big datafication unit 310 may map at least one taxi call signal on a location, time, and day of the week, store it as an accumulated history log, and build big data. In this case, the big datafication unit 310, in the case of interlocking with a meter in the taxi terminal 400, may track a GPS, in addition to taxi call signal, from a point where the meter's counting starts and may map and store the GPS together with a position, time and date thereof, at a point where the meter's counting is terminated, so that the big datafication unit 310 may collect big data. In this case, in addition to taxi operation due to a call, it is possible to obtain information about when a passenger boarded directly on a road in general, so that a magnitude of data is increased enough to produce statistics, so reliability can be increased.

The big datafication unit 310 may perform pre-processing including mapping at least one taxi call signal on a location, time, and day of the week and storing of raw data corresponding to an accumulated history log in a distributed and parallel manner, cleaning of unstructured data, structured data, and semi-structured data included in the stored raw data, and classifying as meta data, and perform analysis including data mining on the pre-processed data.

In this case, in addition to the above-described location, time, and day of the week, other variables that affect taxi demand, such as weather, demographic statistics, commercial sphere, public transportation information, can be added and analyzed. In addition, if an occasion or event is held, demand can be expected to increase, so occasion or event information can also be stored.

In this case, data mining may perform classification that predicts a class of new data by searching for an intrinsic relationship between pieces of data preprocessed and learning a training data set with a known class, or may perform clustering that groups pieces of data based on similarity without class information. Of course, in addition to this, various mining methods may exist, and they may be mined differently depending on a type of big data to be collected and stored or a type of query to be requested later. The big data constructed in this way may go through a verification process with machine learning or deep learning of an artificial neural network. In this case, for the artificial neural network, a CNN (Convolutional neural network) structure may be used. This is because the CNN has a network structure using a convolutional layer and the CNN is suitable for image processing and may classify images based on features in the images by using image data as input. In addition, text mining is a technology intended to extract and process useful information from unstructed/semi-structured text data based on natural language processing technology. Text mining is a technique which extracts and processes useful information from unstructured/semi-structured text data based on a natural language processing technique. By means of the text mining technique, meaningful information is extracted from a vast text cluster, linkages with other information are identified, and a category of the text is found out or a result more than just information search may be obtained. By using this, in the matching service according to the exemplary embodiment of the present disclosure, a large capacity of language resources and statistical and regular algorithms may be used to analyze an identifier or a natural language which is input as a query and discover information hidden therein. In addition, cluster analysis can be used to finally discover groups of similar characteristics while combining objects with similar characteristics.

For example, the big datafication unit 310 estimates the kernel density of taxi rides through a taxi call signal (call summation) and taxi ride data (interlocking with the meter, and may compare and analyze the kernel density with location data of taxi ranks. Analysis tools may be GeoDa and Arcgis 10.22, but are not limited thereto. First of all, whether there is a dense area of taxi rides may be figured out through Moran's I analysis, and areas where taxi rides are densely concentrated may be figured out using the Inverse Distance Weighting and Spatial Weighted Matrix. A value of Moran's I is a spatial autocorrelation index, which is calculated as a value between −1 and 1. The value of Moran's I of 0 indicates a random distribution, the value of Moran's I of −1 indicates that the correlation between neighboring regions is negative, and the value of Moran's I of 1 indicates that the correlation between neighboring regions is positive.

A hot-spot where taxi rides are concentrated can be obtained by hot-spot analysis, and administrative districts can be extracted based on the number of hot-spots. Unlike Moran's I, hot-spot analysis analyzes spatial correlation of data locally, and when the correlation is positive, it is classified as a hot-spot, and when the correlation is negative, it is classified as a cold-spot. When analyzed with point data, the hot-spot is formed with point data. When many hot-spots exist in an administrative district, it can be judged as a place where taxis are spatially concentrated, and the number of hot-spots spatially existing in the administrative districts may be calculated as a point counter to select an administrative district where taxi rides are concentrated. Taxi rides in the selected administrative district may be visualized as a taxi ride density area through Kernel Density Estimation (KDE). Density estimation means estimating density (probability) of all possible values of the variable from data observed in the corresponding variable. That is, it is possible to estimate the density (probability) of values that taxi rides can have through taxi call signals and taxi ride data accumulated through the Kernel Density Estimation. Finally, it is possible to set the visualized taxi ride density area as a hot-spot, and calculate predicted taxi demand according to a corresponding location, day of the week, and time.

The prediction unit 320 may perform data mining on big data to execute taxi demand prediction based on a taxi call signal corresponding to a location, time, and day of the week. In this case, the big data may be collected data and the number of calls described above, but a value to be used in an initial system is required until this data is accumulated. That is, "big data" usable until data enough to drive the system is accumulated is required, which may use for example, taxi operation data (including road information) of Seoul open data square. As in the method described above, when big data is accumulated and a hot-spot is selected, it is necessary to predict "demand" using this. In this case, the collected data is organized by leaving only attributes suitable for demand prediction and pattern analysis, and pre-processing is performed to match a label with another data set used. Then, the prediction unit 320 may establish a prediction model with the past taxi getting-on and off data using time series prediction, for example, using a CB predictor of Oracle Crystalball, predict the expected number of passengers by place, time, and day of the week, visualize a predicted value, for example, visually display a predicted result on a map using Microsoft's Power BI, and figure out whether weather or events affect the number of passengers, using changes due to the weather or changes due to the events or occasions. Next, in analyzing a pattern, an administrative area to which an actual road name of the LINK ID expressed in (X,Y) coordinates belongs is converted into a text value or a numeric code to thereby establish consistency, and the pattern is analyzed. For example, a Dplyr package of R programming is used to filter only data that satisfies a specific condition, and then the sum of the number of rides of filtered data is calculated. An analysis result is expressed again using POWER map. When the demand prediction and pattern analysis are completed in this way, the result can be transmitted to the taxi terminal 400 of a taxi driver who is a demander.

The transmission unit 330 may transmit a taxi demand amount which is predicted on a location, time and day of the week where the taxi demand prediction is executed, to the taxi terminal 400. At this time, it may be to give a movement command. In this case, as will be described later, if this information is broadcast randomly because there is a large amount of taxi demand, the possibility that an arbitrary plurality of taxis will be concentrated to the location should not be excluded. For example, assuming that demand amount predicted in time B on day C of the week in area A was 100 people, cases where 300 taxi drivers who got the information of 100 people arrived in time B on day C, but ⅔ of those returned with empty cars because of no passenger, should not happen. Accordingly, by receiving a real-time GPS and updating an empty car list and a supply and demand list in real time, it is feasible to instruct them to move to another hot-spot when the real-time supply amount is greater than predicted demand.

When receiving a taxi call from the user terminal 100, the matching unit 340 may automatically match the taxi terminal 400 located at a shortest distance from a current location of the user terminal 100. The matching unit 340 may call the taxi terminal 400 located at a shortest distance from the user terminal 100 with at least one taxi call list and an empty car list as input values by using an optimal algorithm for assignment problem through which an optimal solution for the assignment problem is obtained. Accordingly, the user terminal 100 may call a taxi by inputting the current location and destination thereof and receive and output a vehicle number and an expected arrival time of the called taxi. The taxi terminal 400 receives a taxi call signal that is matched with automatic allocation in response to the taxi call of the user terminal 100, and if outputting an approval event in response to the received taxi call signal, may start destination guidance to the current location of the user terminal 100.

As for the assignment problem, there are multiple supply sources (Si, i=1, 2, . . . m) and demand sources (Dj, j=1, 2, . . . n), and both supply and demand are 1 all the time. In addition, transport costs (cij) are all different, and transport must be made only from one supply source to one demand source. In this case, it is a problem of allocating xij=1 to find an optimal solution (z, hereinafter, Equation 1) in which the sum of total transportation costs is minimized.

$$Z = \sum_{i=1}^{m} \sum_{j=1}^{n} c_{ij} x_{ij}$$ [Equation 1]

In an m×n cost matrix, a case of m=n is referred to as a balanced assignment problem, and a case of m≠n is referred to as an unbalanced assignment problem. Mostly, Hungarian algorithms are applied as ways to solve the assignment problem, and in some cases, genetic algorithms are tried. Execution complexity of the Hungarian algorithm is O(n²), and it is known that an optimal solution can always be found for a balanced assignment problem. However, even for the balanced assignment problem, there are cases where an optimal solution cannot always be found, so a process of verifying whether an optimal solution is obtained is necessary. In addition, since an optimal solution for an unbalanced assignment problem may not be found, a balanced allocation should be created by adding a dummy row or column with a cost of all 0 (zero) before applying the algorithm. In addition, the Hungarian algorithm has inconvenience in which it is necessary to select only one among the costs of zeros obtained last such that they do not overlap in respective columns, and a process of drawing m lines containing 0 (zero) must be repeatedly performed.

Accordingly, in the method according to an exemplary embodiment of the present disclosure, a simple and generally applicable algorithm that always finds an optimal solution for all cases irrelevant to a size of the cost matrix and irrelevant to the balance and unbalanced assignment problems can be used. If time is lost in finding the optimal solution when a customer calls, and there is a delay, it is a loss to both a customer and a taxi driver. Therefore, it is possible to use an optimal allocation algorithm because the optimal allocation algorithm can quickly find an optimal solution while being applied more simply compared to the Hungarian algorithm. The execution complexity of this algorithm can significantly reduce the execution complexity $O(n^2)$ of the Hungarian algorithm to $O(n)$.

First, before describing the algorithm of the present disclosure, the concept of a representative Hungarian algorithm is briefly described.

The assignment problem is a special case of the transport problem, where both the supply and the demand are 1. One supply source must select only one demand source that minimizes a cost. Also, one demand source must select only one supply source. Since this is generally applied when assigning work to a machine or assigning a task to a person, it is also referred to as an assignment problem, and the assignment problem seeks an optimal solution for a condition that satisfies the following Equation 2 in the above Equation 1. In this case, when j=1, 2, ... n, each demand amount is 1 and when i=1, 2, ... m, each supply amount is 1.

$$z = \min \sum_{i=1}^{m} \sum_{j=1}^{n} c_{ij} x_{ij} \quad \text{[Equation 2]}$$

$$\text{s.t.} \sum_{i=1}^{m} x_{ij} = 1, \text{ for } j = 1, 2, \ldots, n$$

$$\sum_{j=1}^{n} x_{ij} = 1, \text{ for } i = 1, 2, \ldots, m$$

$$x_{ij} \geq 0, \text{ for } \forall_{ij}$$

The Hungarian algorithm for finding the optimal solution for the assignment problem was proposed in 1955 by Hungarian mathematician Harold Kuhn and supplemented by James Munkres in 1957. Therefore, it is also called the assignment algorithm or Kuhn-Munkres algorithm.

In the optimal assignment algorithm according to an exemplary embodiment of the present disclosure, first, only a minimum cost (minci) of each row and a minimum cost (mincj) of a column are selected. Among the selected minci and mincjs, only one cell (si=0 or sj=0) in the row or column is determined, and si and sj, which are the selected numbers in the row and column, are recalculated. If there are multiple costs cij of unselected {i,j} cells (si=0 or sj=0), a reduced cost matrix targeting only these cells is repeatedly performed.

Second, in the case of substituting the selected cij≠(minci, mincj), and if the cost can be reduced in alternative selection with the non-selected cij=(minci,mincj), an initial solution is improved to obtain an optimal solution. In this case, a process of obtaining the initial solution and a process of verifying whether the optimal solution is obtained are simplified. In a process of deriving the initial solution, $O(2n)=O(n)$ because a minimum value for the row is performed with $O(n)$ complexity and a minimum value for the column is performed with $O(n)$ complexity. The execution complexity is the same even in a process of reperforming the first step targeting a reduced matrix from which at least two are selected in at the end of the first step. Also, since an optimization process does not target all values of an m×n matrix, but only targets up to n edges from a starting point to a destination, these edges can be found with a complexity of $O(n)$. Therefore, this algorithm has an execution complexity of $O(n)$.

In this case, no matter how simply the optimal solution is optimized, a calculation process is repeated until a correct value is obtained, and thus, a delay may occur. In this case, it is possible to end the calculation only with a general approximation without finding the optimal solution complicatedly. That is, in order to increase the speed of obtaining an optimal solution for an assignment problem, calculation of an optimized approximate solution may be performed using a simulated annealing. The simulated annealing was designed by modeling an energy change process of atoms so as to find a global optimum of a search space. When metal is heated, the atoms become unstable, leaving initial positions thereof and wandering. And, when a temperature of the metal is gradually lowered, it is possible to find a global optimum that has a lower energy than the initial state, while the atoms are stabilized at positions where they have moved. A new solution is selected within a neighboring range of a current solution.

And, the simulated annealing determines whether to newly update the current solution to the selected solution or otherwise, not to change the current solution. Cost values of the current solution and a newly created solution are used to update the current solution. The cost value represents the fit of the current solution to a test target. If the current solution meets the test target, it has a cost value of zero. If the cost value of the newly created solution is less than the cost value of the current solution, the current solution is updated with the newly created solution. But if not, the new solution is updated according to acceptance probability proportional to temperature parameter t. And, through a cooling process, temperature which is a parameter affecting the acceptance probability, is reduced. As a simulated annealing algorithm is repeated, the temperature is continuously lowered by cooling, so the acceptance probability also decreases proportionally. As the acceptance probability decreases, the probability that the current solution changes only to a value close to a target solution increases. This process is repeated until a termination condition of the algorithm is satisfied. Termination conditions commonly used include target solution achievement, a maximum number of repetitions, a maximum execution time, and the like. In an exemplary embodiment of the present disclosure, a method of finding an approximate value with the maximum execution time is used. Of course, it does not preclude the use of other methods.

In this case, a genetic simulated annealing may be used to fine an approximate value of the optimal solution. The genetic simulated annealing is an algorithm that combines strengths of a simulated annealing and a genetic algorithm.

Stochastic hill climbing, one of characteristics of the simulated annealing, finds a solution through random changes within a range inside a neighboring distance. For this reason, the simulated annealing shows excellent search performance in local search, but shows relatively poor search performance in global search (whole area search). Meanwhile, the genetic algorithm is efficient for global search because it changes a solution using a crossover algorithm, but its search performance is relatively degraded in local search, which requires detailed search of a narrow space. In order to take advantages of these two algorithms, in the genetic simulated annealing, a search may be performed using a method that combines hill climbing characteristics of the simulated annealing and a crossover operation of the genetic algorithm. First, the genetic simulated annealing selects a genetic algorithm and performs a cross operation to search for a candidate solution in a global space (whole space). After that, the genetic simulated annealing performs a simulated annealing to search for a candidate solution in a local space.

In addition, as a method of calculating an optimized approximate solution, a simulated annealing using branch distance neighborhood selection may be used. In this case, a branch distance is a value to evaluate how close test data is to a test target. As a test case approaches the test target, a branch distance value decreases. The most representative branch distance calculation method used in search-based software testing is a Korel's method. In an exemplary embodiment of the present disclosure, the Korel's method can be used by modifying a calculation method for > and <operators. The branch distance is calculated based on a difference between the test target and current test data.

The branch distance neighborhood selection is a method for improving the efficiency of a neighborhood selection method of the simulated annealing. That is, an improved simulated annealing using branch distance neighborhood selection is an improvement in the neighborhood selection method of the simulated annealing. The branch distance neighborhood selection consists of two steps: a macro-step and a micro-step. The branch distance neighborhood selection can be used to overcome the limitation of poor search performance in a wide range of domains of the simulated annealing. The macro-step is a step that effectively performs a global search by selecting a candidate solution as a value far from a current solution. The micro-step is a step that performs a narrow range of area search, like the simulated annealing. The macro-step or micro-step is selected according to a distance between the current solution and the target solution. If the branch distance is greater than a neighboring range N, the macro-step is selected to quickly approach the target solution. If not, the micro-step is applied to search for the global space (whole space).

For example, assume that v1 is initial test data and vs is target test data. First, since a branch distance between v1 and vs is greater than the neighboring range N, a macro-step is applied to generate v2. And, since a branch distance between v2 and vs is still greater than N, the macro-step is applied again to generate v3. Since a branch distance between v3 and vs is less than N, a macro-step is performed to generate v4. This search process is repeated until current test data vn reaches the target test data vs. The macro-step changes the current test data by an amount equal to the branch distance between the current test data and the target solution. If the test data is composed of several variables, one variable is randomly selected among several variables to thereby change one value. For example, when a variable x to randomly perform a search is selected from test data composed of variables x, y, z, neighborhoods that can be selected as new solutions are defined as x±branch distance, y, z. The micro-step changes a value of each variable in the test data by a random value within the neighboring range N. For example, test data composed of variables x, y, z change to x±r1, y±r2, z±r3, respectively, that are shifted by ri, which is an arbitrary value under the neighboring range N.

The alarm unit 350 may transmit a taxi call signal to the taxi terminal 400 matched by the matching unit 340 and transmit a vehicle number and an expected arrival time to the user terminal 100 when receiving an approval event. In this case, the matching unit 340 may select and match one taxi terminal 400 in response to one taxi call from the user terminal 100. In publicly and commonly known prior arts, there is a competitive method in which a call is spread to all adjacent taxi drivers like broadcasting and a person who responds first takes it, However, in an exemplary embodiment of the present disclosure, since one person's call is transmitted to one person, the taxi driver can perform safety driving without keeping eyes on the call so as to avoid missing this call, or without thinking that the call was missed and an opportunity cost was discarded. In this case, the driver's choice is an acceptance or refusal. If the driver accepts, the driver can go to pick up a passenger in a one-to-one matching manner, and if the driver rejects, the driver just does not go. In this case, it is possible to reduce a call rejection rate by not indicating a destination. In addition, the taxi terminal 400 capable of receiving a call (taxi call) targets an empty vehicle in which the meter is not turned on or which is not in a state running by receiving a call.

To this end, when a plurality of taxi terminals 400 accept the call signal of the user terminal 100 or when a meter mounted in a taxi starts counting, the update unit 360 may update an empty car list in real time so that the empty car list moves to a drive list.

In this case, the taxi terminal 400 is a plurality of taxi terminals 400 held by a plurality of taxi drivers. While forecasting demands is important, it is also important to figure out how many supplies exist to respond to an actual demand. Accordingly, the relocation unit 370 figures out real-time locations of the plurality of taxi terminals 400, and when a difference between the taxi demand amount which is predicted on the location, time and day of week where the taxi demand prediction is executed, and a taxi supply amount which is figured out in real time on the corresponding location, time and day of the week exceeds a preset error range, the relocation unit 370 may transmit an alarm to the plurality of taxi terminals 400 so as to block an entry to the location where the taxi demand prediction is executed. In this case, the taxi terminal 400 is a plurality of taxi terminals 400 held by a plurality of taxi drivers. Here, the relocation unit 370 commands a taxi to move from an area where taxi supply is likely to exceed to an area where taxi demand is expected to be insufficient. A relocation algorithm is an algorithm that makes a decision to relocate some taxis according to demand when there is a discrepancy between the current state considering a location of current taxis or their destination locations if they are in operation, and an expected demand. The relocation algorithm may be basically similar to the allocation algorithm.

Hereinafter, an operation process according to a configuration of the matching service providing server of FIG. 2 will be described in detail with reference to FIGS. 3A to 5B, by way of example. However, it will be apparent that the embodiment is only any one of various embodiments of the present disclosure, and is not limited thereto.

Figure 3A:
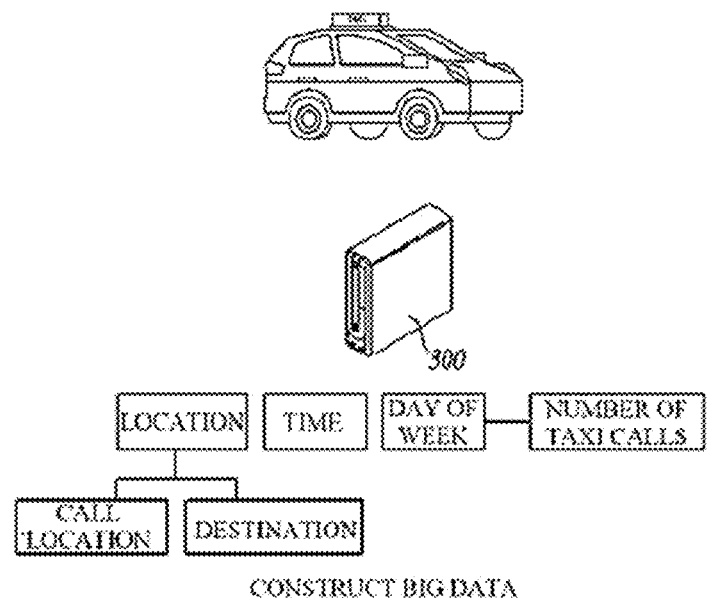
FIGS. 3A, 3B, 3C, 3D, 4A, 4B, 4C, 4D, 5A and 5B are views for explaining an exemplary embodiment in which a big data-based AI automatic allocation matching service using taxi demand prediction according to an exemplary embodiment of the present disclosure is implemented.
Figure 3B:
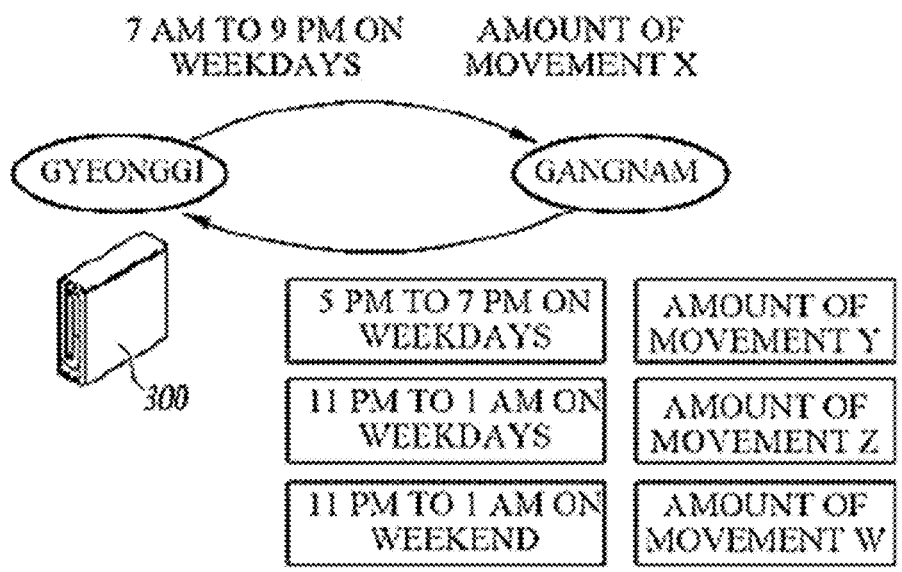
Figure 3C:
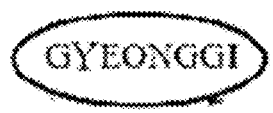
Figure 3C:
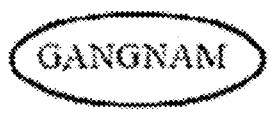

Referring to FIG. 3A, when collecting and constructing big data, the matching service providing server 300 collects operation data and constructs big data by interlocking with variables such as locations, time, day of the week, and weather, the number of taxi calls, and a taxi meter. In this case, the locations may include a call location or a boarding location, and a destination. For example, as in FIG. 3B, it is assumed that the amount of movement from Gyeonggi to Gangnam is X, and is concentrated from 7 am to 9 am on weekdays, and similarly, a pattern of big data is analyzed by assuming that the amount of movement which is immediately after work hours and public transportation cut-off and the amount of movement which is immediately after public transportation cut-off on a weekend evening are Z and W, respectively.

Figure 3D:
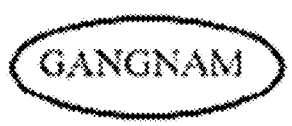

In this case, in moving from Gyeonggi to Gangnam (see FIG. 3C), predicted demand is X at 7 am to 9 am on weekdays, so if X taxis are waiting in an area of Gyeonggi at 7 am to 9 am on weekdays, the supply and demand will match with each other. Likewise, in moving from Gangnam to the area of Gyeonggi, the predicted demand is Y at 5 pm to 7 pm on weekdays, so even if there are Y taxis waiting in an area of Gangnam, the demand and supply match with each other and thus, there is no such thing as refusal of passengers and even, taxis do not travel with an empty state. In this case, as shown in FIG. 3D, when taxies move to Gangnam, assuming that the real-time supply, that is, the number of taxis moved is A, and the predicted demand is Y, the supply stops if A is greater than Y, and if Y is less than A, the supply must start or continue.

Figure 4A:
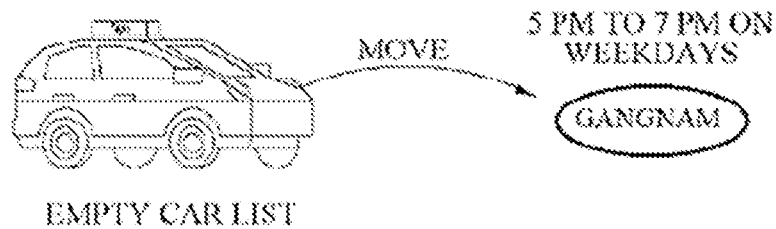
Figure 4B:
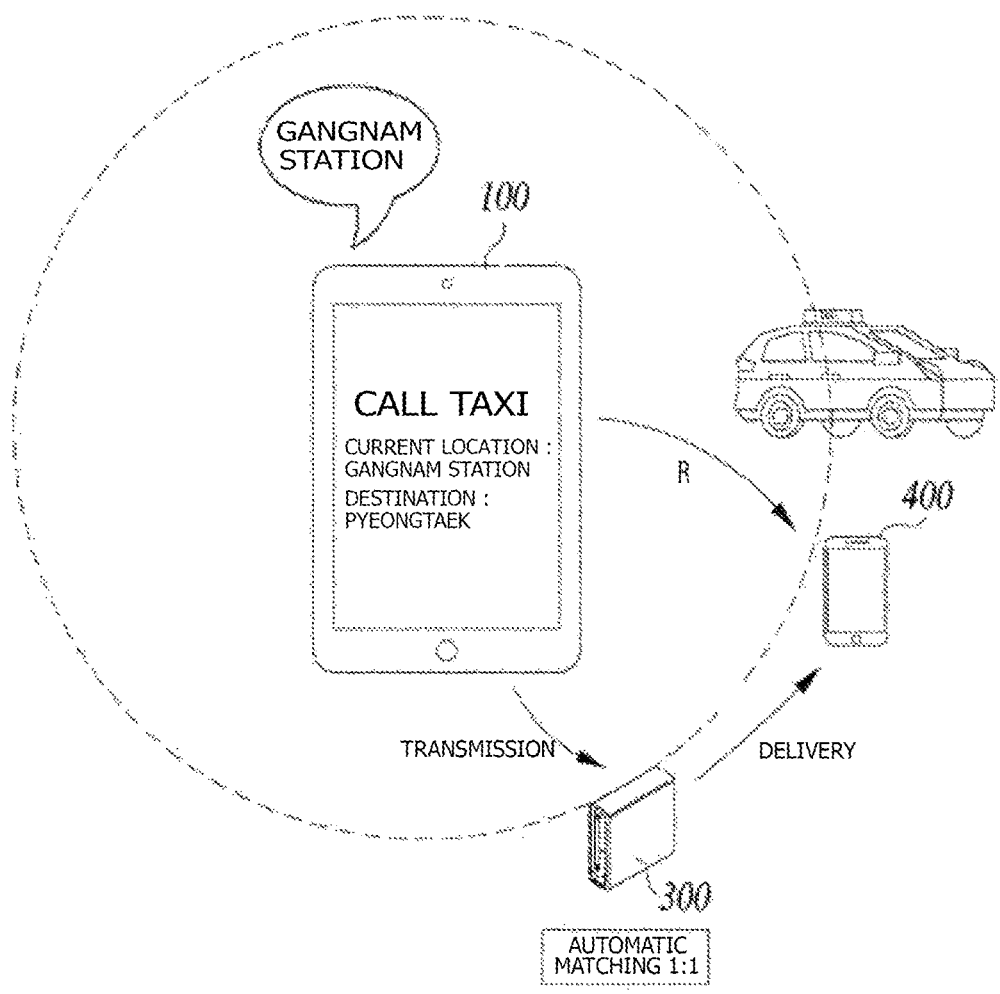
Figure 4C:
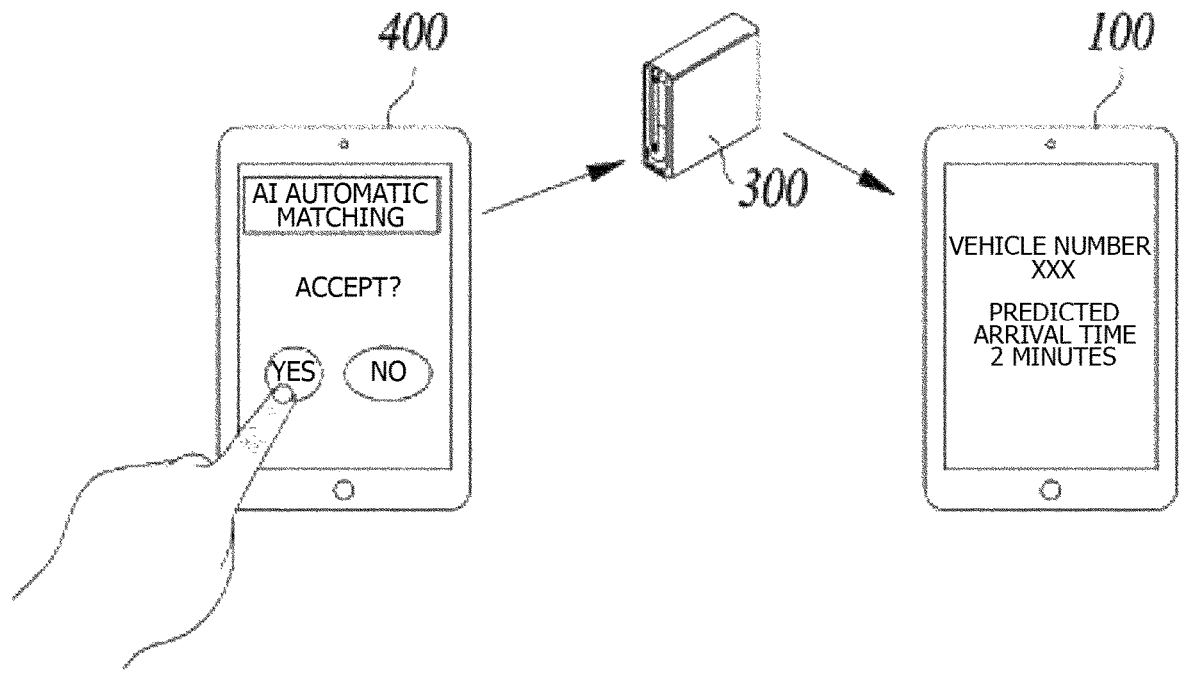
Figure 4D:
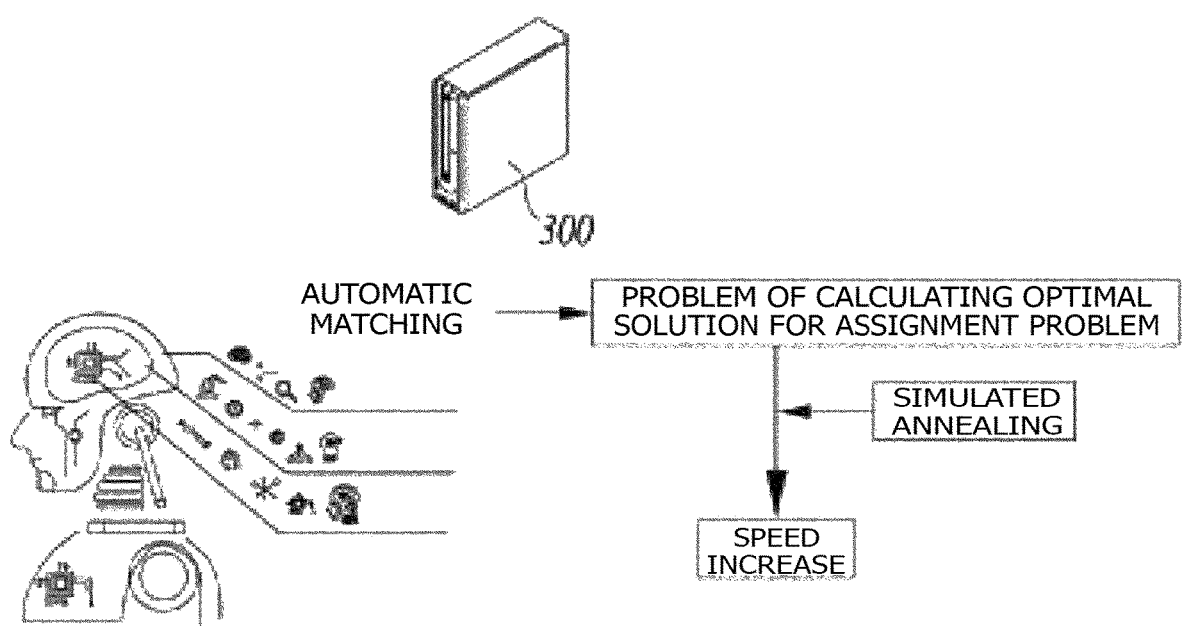

In this case, referring to FIG. 4A, the matching service providing server 300 according to an exemplary embodiment of the present disclosure updates the empty car list in real time and may allow taxies to move so as to meet the expected demand Y at 5 pm to 7 pm on weekdays. Here, as shown in FIG. 4B, when the taxi call comes from Gangnam Station, the matching service providing server 300 needs to solve an assignment problem for an optimal solution and allocate a taxi of the shortest distance to a passenger within a shortest time. In a case where a matched and automatically allocated taxi accepts as shown in FIG. 4C, the matching service providing server 300 guides vehicle information to the user terminal 100. In this case, in a situation where the optimal solution for the assignment problem is obtained as in FIG. 4D, an approximate solution is calculated using the simulated annealing to thereby reduce complexity and reduce calculated time, so that time required for matching may decrease.

Figure 5A:
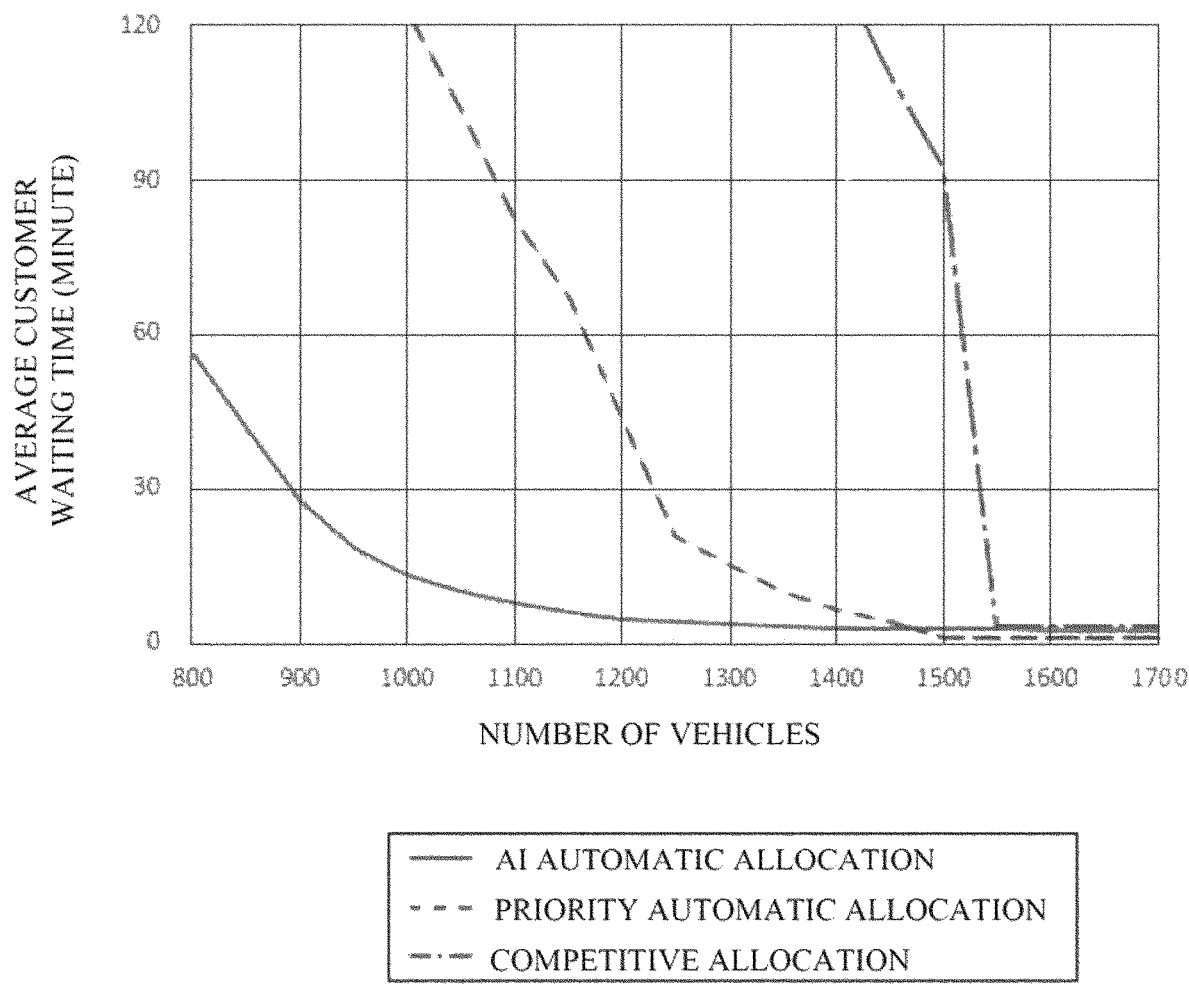
Figure 5B:
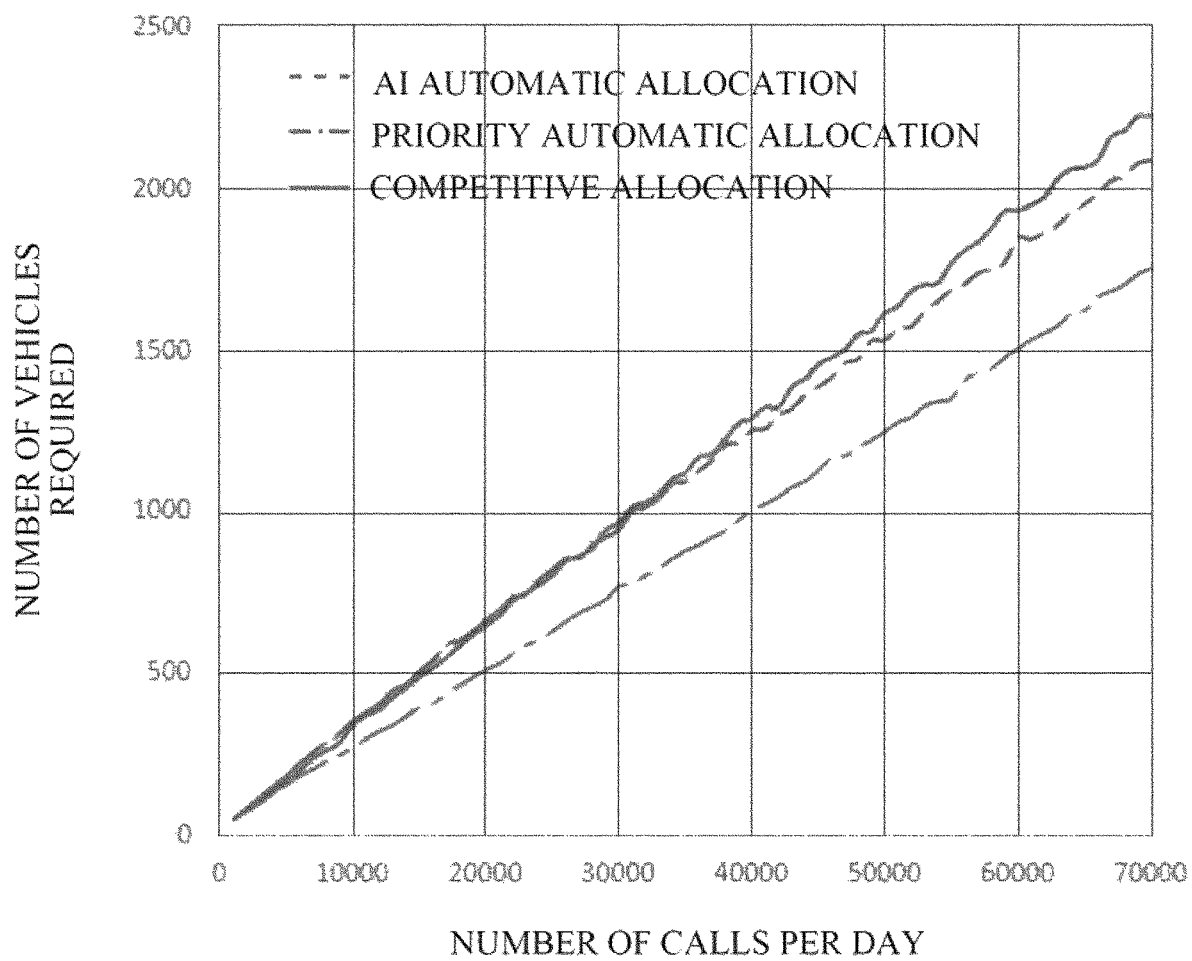

FIG. 5A is a graph showing changes in customer waiting time in a method for providing an AI automatic allocation matching service (AI automatic allocation, blue) according to an exemplary embodiment of the present disclosure, a priority automatic allocation (black), and a competitive allocation (red). It can be seen that the AI automatic allocation according to an exemplary embodiment of the present disclosure has a significantly shorter customer waiting time compared to other methods. It can be seen that an AI allocation algorithm held by the same number of vehicles and the same number of calls lowers an average customer waiting time. FIG. 5A shows average customer waiting times measured through operating with three different allocation algorithms by fixing the number of calls and varying the number of vehicles, wherein Blue is an AI automatic allocation algorithm, and red is a current competitive allocation method. In addition, referring to FIG. 5B, as a result of simulating a required minimum number of vehicles according to the number of calls on the condition that the average customer waiting time satisfies 5 minutes, it could be confirmed that the AI automatic allocation algorithm requires vehicles of about 65% as compared to the current vehicles. In other words, it can be seen that faster allocation is possible with fewer vehicles.

Contents of the method for providing a big data-based AI automatic allocation matching service using taxi demand prediction of FIGS. 2 to 5B which have not been described are the same as the description of the method for providing a big data-based AI automatic allocation matching service using taxi demand prediction which has been explained with reference to FIG. 1 or easily inferred from the description so that the description thereof will be omitted.

Figure 6:
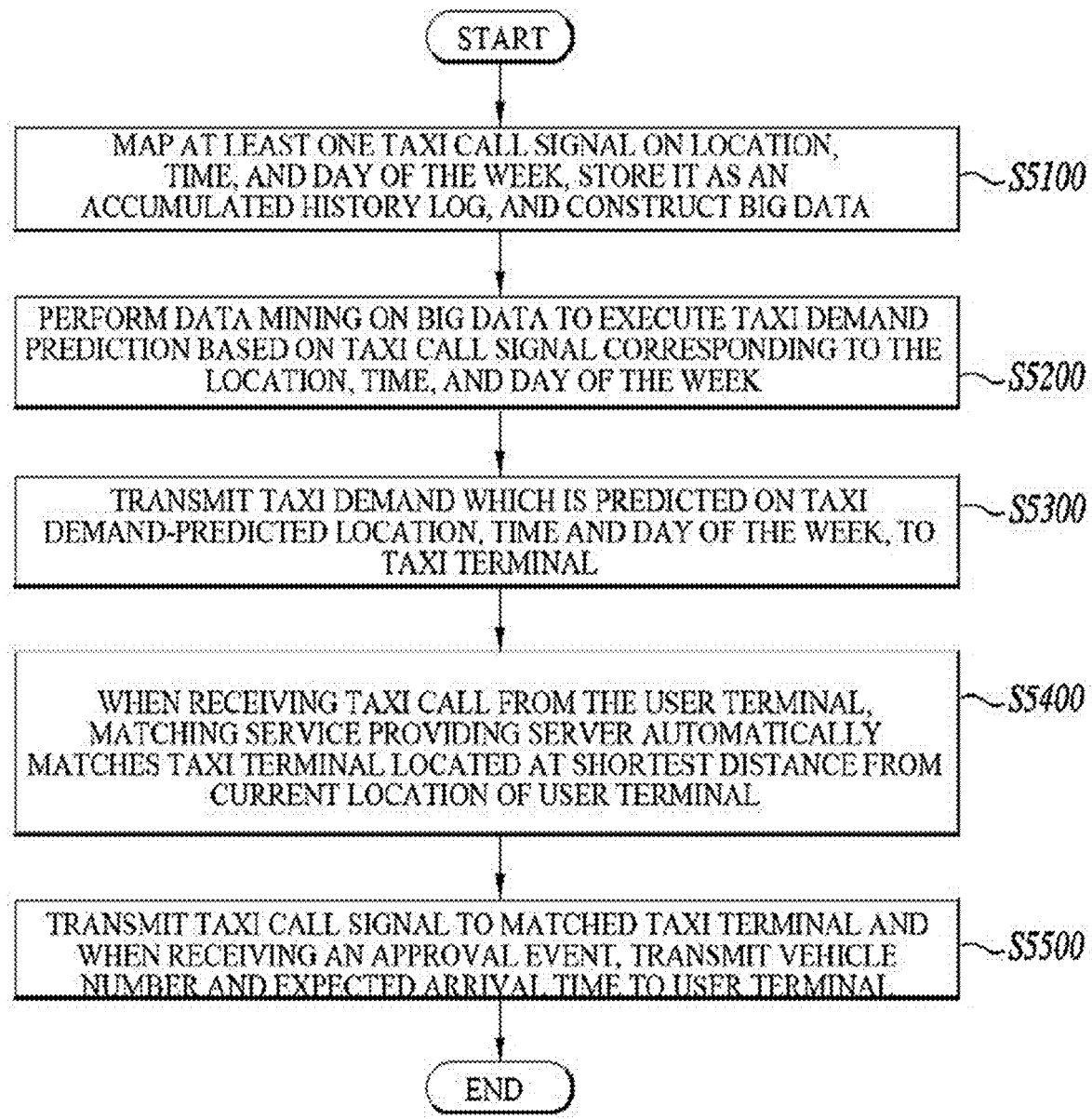
FIG. 6 is an operational flowchart for explaining a method for providing a big data-based AI automatic allocation matching service using taxi demand prediction according to an exemplary embodiment of the present disclosure.

FIG. 6 is a view illustrating a process of transmitting and receiving data between components included in the system for providing a big data-based AI automatic allocation matching service using taxi demand prediction of FIG. 1 according to an exemplary embodiment of the present disclosure. Hereinafter, an example of a process of transmitting and receiving data between the components will be described with reference to FIG. 6, but it is obvious to those skilled in the art that the present disclosure is not interpreted to be limited to the exemplary embodiment and the process of transmitting and receiving data illustrated in FIG. 6 may vary depending on the above-described various exemplary embodiments.

Referring to FIG. 6, the matching service providing server maps at least one taxi call signal on a location, time, and day of the week, stores it as an accumulated history log, and constructs big data, in step S5100.

In addition, the matching service providing server performs data mining on big data to execute taxi demand prediction based on the taxi call signal corresponding to the location, time, and day of the week, in step S5200, and transmits a taxi demand amount which is predicted on a location, time and day of the week where the taxi demand prediction is executed, to the taxi terminal, in step S5300. Here, a taxi relocation decision is made according to predicted taxi demand, and a relocation command is transmitted to a taxi terminal of a vehicle that needs to be moved.

In addition, when receiving a taxi call from the user terminal, the matching service providing server automatically matches a taxi terminal located at a shortest distance from a current location of the user terminal, in step S5400, and transmits a taxi call signal to the matched taxi terminal and when receiving an approval event, transmits a vehicle number and an expected arrival time to the user terminal, in step S5500.

The order between the above-described steps S5100 to S5500 is just an example, but is not limited thereto. That is, the order between the above-described steps S5100 to S5500 may be changed and some of the steps may be simultaneously performed or omitted.

Contents of a method for providing a big data-based AI automatic allocation matching service using taxi demand prediction of FIG. 6 which have not been described are the same as the description of the method for providing a big data-based AI automatic allocation matching service using taxi demand prediction which has been explained with reference to FIGS. 1 to 5B or easily inferred from the description so that the description thereof will be omitted.

The method for providing a big data-based AI automatic allocation matching service using taxi demand prediction according to the exemplary embodiment described with reference to FIG. 6 may be implemented as a recording medium including an application executed by a computer or an instruction which can be executed by a computer such as a program module. The computer-readable medium may be an arbitrary available medium which is accessed by a computer and includes all of a volatile and non-volatile medium, a removable and non-removable medium. Further, the computer-readable medium may include all of a computer storage medium. The computer storage medium includes all of a volatile and non-volatile, a removable and non-removable medium which is implemented by an arbitrary method or a technique for storing information, such as a computer-readable command, a data structure, a program module, and other data.

The above-described method for providing a big data-based AI automatic allocation matching service using taxi demand prediction according to the exemplary embodiment of the present disclosure may be executed by an application (including a program included in a platform, an operating system, or the like installed as default in the terminal) which is installed as default in a terminal or executed by an application (that is, a program) which is directly installed in a master terminal by means of an application providing server such as an application store server, an application, or a web server related to the corresponding service, by a user. In this meaning, the above-described method for providing a big data-based AI automatic allocation matching service using taxi demand prediction according to the exemplary embodiment of the present disclosure may be implemented by an application (that is, a program) which is basically installed in the terminal or is directly installed by the user and may be recorded in a computer-readable recording medium such as a terminal.

The above description of the present disclosure is illustrative only and it is understood by those skilled in the art that the present disclosure may be easily modified to another specific type without changing the technical spirit of an essential feature of the present disclosure. Thus, it is to be appreciated that embodiments described above are intended to be illustrative in every sense, and not restrictive. For example, each component which is described as a singular form may be divided to be implemented and similarly, components which are described as a divided form may be combined to be implemented.

The scope of the present disclosure is represented by the claims to be described below rather than the detailed description, and it is to be interpreted that the meaning and scope of the claims and all the changes or modified forms derived from the equivalents thereof come within the scope of the present disclosure.

What is claimed is:

1. A system for providing a big data-based AI automatic allocation matching service using a taxi demand prediction, the system comprising:
    a user terminal comprising a hardware processor configured to:
        input a current location and a destination;
        transmit a taxi call, to a matching service providing server connected with the user terminal via a network; and
        receive a vehicle number and an expected arrival time of a called taxi, from the matching service providing server; and
        output the received vehicle number and expected arrival time;
    a taxi terminal comprising a hardware processor configured to:
        receive a taxi call signal, which is matched with automatic allocation in response to the taxi call transmitted from the user terminal;
        start, when an approval event in response to the received taxi call signal is output, a destination guidance to the current location of the user terminal;
        transmit an exclusion request signal, which is a GPS signal for requesting exclusion of a corresponding taxi from an empty car list, to the matching service providing server connected with the taxi terminal via the network; and
    the matching service providing server comprising a hardware processor configured to:
        map at least one taxi call signal on a location, time, and day of week;
        store the mapped at least one taxi call signal as an accumulated history log, and build big data;
        perform a verification process of the big data with machine learning or deep learning of an artificial neural network having a Convolutional neural network (CNN) structure;
        perform data mining on the big data to execute the taxi demand prediction based on the taxi call signal corresponding to the location, time, and day of week;
        estimate a kernel density of taxi rides through a taxi call signal and taxi ride data, compare and analyze the kernel density with location data of taxi ranks, to find out whether there is a dense area of taxi rides by using Moran's I analysis, and to find out areas where taxi rides are densely concentrated by using Inverse Distance Weighting and Spatial Weighted Matrix;
        execute the taxi demand prediction on the location, time and day of week, based on the estimated kernel density,
        transmit a taxi demand amount that is predicted on the location, time and day of week where the taxi demand prediction is executed, to the taxi terminal;
        match a single taxi terminal located at a shortest distance from a current location of the user terminal, when the taxi call is received from the user terminal; and
        transmit, via the network, the taxi call signal to the matched single taxi terminal, and transmit, via the network, the vehicle number and the expected arrival time to the user terminal when an approval event is received from the taxi terminal,
    wherein the processor of the matching service providing server is further configured to:
        call the taxi terminal located at the shortest distance from the current location of the user terminal, by using at least one taxi call list and the empty car list as input values to an optimal algorithm for an assignment problem through which an optimal solution for the assignment problem is obtained,
    wherein, to increase a speed of obtaining the optimal solution for the assignment problem, calculation of an optimized approximate solution is performed using a simulated annealing, and
    wherein the processor of the matching service providing server is further configured to:
        perform the taxi demand prediction by: establishing a prediction model with past taxi getting-on and-off data using time series prediction, by using a computer-based algorithm; predicting an expected number of passengers by place, time, and day of the week; visually displaying a predicted result on a map; and figuring out whether weather or events affect the number of passengers, using changes due to the weather or changes due to the events;
        perform a pattern analysis by: converting an administrative area to which an actual road name of (X,Y) coordinates belongs into a text value or a numeric code; filtering data that satisfies a specific condition; and calculating a sum of a number of rides of filtered data; and
        transmit results of the taxi demand prediction and the pattern analysis to the taxi terminal.

2. The system of claim 1, wherein the processor of the matching service providing server is further configured to select and match one taxi terminal in response to one taxi call from the user terminal.

3. The system of claim 1, further comprising a plurality of taxi terminals held by a plurality of taxi drivers,
wherein the processor of the matching service providing server is further configured to:
update the empty car list in real time so that the empty car list moves to a drive list, when the plurality of taxi terminals accept the call signal of the user terminal or when a meter mounted in the taxi starts counting.

4. The system of claim 1, further comprising a plurality of taxi terminals held by a plurality of taxi drivers,
wherein the processor of the matching service providing server is further configured to:
figure out real-time locations of the plurality of taxi terminals, and when a difference between the taxi demand amount and a taxi supply amount, which is figured out in real time on the corresponding location, time and day of week exceeds a preset error range, and transmit an alarm to the plurality of taxi terminals so as to block an entry to the location where the taxi demand prediction is executed.

5. The system of claim 1, wherein the processor of the matching service providing server is further configured to perform pre-processing including mapping at least one taxi call signal on a location, time, and day of week and storing of raw data corresponding to an accumulated history log in a distributed and parallel manner, cleaning of unstructured data, structured data, and semi-structured data included in the stored raw data, and classifying as meta data, and perform analysis including the data mining on the pre-processed data.

\* \* \* \* \*